United States Patent
Wu (10) Patent No.: US 8,896,702 B2
(45) Date of Patent: Nov. 25, 2014

(54) SYSTEM AND METHOD FOR PROCESSING DIGITAL SIGNALS OF AN INFRARED IMAGE

(71) Applicant: Guangzhou SAT Infrared Technology Co. Ltd., Guangdong (CN)

(72) Inventor: Jiping Wu, Guangdong (CN)

(73) Assignee: Guangzhou SAT Infrared Technology Co. Ltd., Guangdong (CN)

( * ) Notice: Subject to any disclaimer, the term of this patent is extended or adjusted under 35 U.S.C. 154(b) by 148 days.

(21) Appl. No.: 13/654,982

(22) Filed: Oct. 18, 2012

(65) Prior Publication Data

US 2013/0100294 A1    Apr. 25, 2013

(30) Foreign Application Priority Data

Oct. 25, 2011    (CN) .......................... 2011 1 0340580

(51) Int. Cl.
*H04N 5/33*    (2006.01)

(52) U.S. Cl.
CPC ..................................... *H04N 5/33* (2013.01)
USPC ....................................................... 348/164

(58) Field of Classification Search
CPC ........................................................ H04N 5/33
USPC ....................................................... 348/164
See application file for complete search history.

(56) References Cited

U.S. PATENT DOCUMENTS

| | | | |
|---|---|---|---|
| 2009/0309996 A1* | 12/2009 | Iguchi et al. | 348/223.1 |
| 2010/0290702 A1 | 11/2010 | Yu et al. | |
| 2012/0224060 A1* | 9/2012 | Gurevich et al. | 348/148 |

FOREIGN PATENT DOCUMENTS

| | | |
|---|---|---|
| CN | 101102438 | 1/2008 |
| CN | 101707666 A | 5/2010 |
| CN | 201910868 U | 7/2011 |
| EP | 0576003 A1 | 12/1993 |
| JP | 2003344167 | 12/2003 |
| JP | 2008532386 A | 8/2008 |
| JP | 2009014475 A | 1/2009 |
| JP | 2009303010 | 12/2009 |
| JP | 2010166143 | 7/2010 |
| WO | 2008154281 A2 | 12/2008 |
| WO | 2009093324 A1 | 7/2009 |

* cited by examiner

*Primary Examiner* — Richard Torrente
(74) *Attorney, Agent, or Firm* — Stoel Rives LLP (57) ABSTRACT

A system and method are provided for processing digital signals of an infrared image. In a frame's backward-stroke, performing a differential weight accumulation process on an original column diagram data representing an original column diagram curve distribution of a current frame image, so as to filter overbright or overdark pixels, and output grayscale value data of a last frame image after being processed in a last frame's backward-stroke. In a frame's forward stroke, receiving the grayscale value data of the last frame image and performing a grayscale shift process in way of multi-meandering lines on the received grayscale value data, so as to perform different levels of brightness grayscale shift for the grayscale value data on bright or dark side, and output the processed grayscale value data of the last frame image. The present application can provide better scene adaptability for the infrared image.

16 Claims, 5 Drawing Sheets

SYSTEM AND METHOD FOR PROCESSING DIGITAL SIGNALS OF AN INFRARED IMAGE

RELATED APPLICATIONS

The present application claims the benefit of foreign priority under 35 U.S.C. 119 based upon Chinese Application 201110340580.5 filed on Oct. 25, 2011, the whole of which is hereby incorporated by reference herein.

TECHNICAL FIELD

The present application relates to the field of infrared imaging technology, and especially relates to the technology for processing digital signals of an infrared image (e.g., implemented by field-programmable gate array (FPGA)).

BACKGROUND

At present, analog signals output from most of the infrared imaging systems and infrared detectors are turned into 14 bit digital signals through front-end analog-to-digital (AD) transformations, whereas the 14 bit digital signals are input into digital signal process modules to be transformed into 8 bit grayscale signals, and then the 8 bit grayscale signals are input into video decode modules to generate standard television (TV) signals so as to be output to monitors.

For turning the input signals of high bits and large dynamic scopes into 256 grayscale signals in conformity with the human eye's observation habits, a digital signal process module is used for performing processes of compress/stretch, overflow/cutoff, brightness shift and gain adjustment on digital signals rapidly and in real time, thereby the input signals of high bits and large dynamic scopes can be turned into image signals in conformity with the human eye's observation habits.

In one prior art system, based on a characteristic that there is usually consistency among current frame images, the accumulated average values of AD values (digitized energy values) of respective points in a last frame image are used as a reference of brightness shifting of a current frame image.

In another prior art system, based on the image equalization technology of column diagram statistics, a distribution curve is obtained by counting the number of pixels of respective grayscale levels in a last frame image, and an image is enhanced by compressing grayscale levels with no pixel numbers or very few pixel numbers and stretching grayscale levels with more pixel numbers when being output.

However, those two prior art systems have disadvantages as below.

For the first prior art system, when a bright target of small area whose brightness is much higher than an average value appears in a scene, the accumulated sum of AD values may be increased significantly, thereby the brightness of the current frame image may be decreased greatly, which even pushes other targets of large areas totally blank, therefore the observation for the target may be deteriorated.

For the second prior art system, while the image is enhanced, the background and noise are also elevated, such that even some "key targets" with small pixel numbers may be merged, and edge pixel points of the targets may also be merged, resulting in loss of image details.

SUMMARY

The present application solves a problem that, when a scene varies in a relatively large scale, an infrared image may have a bad adaptability thus to deteriorate target observations.

Specifically, with respect to the above deficiencies of the first and second prior arts, the present application provides a system and method for processing digital signals of an infrared image, which may have both advantages of the two prior arts and have better scene adaptability. The system and method for processing digital signals of an infrared image may perform differential weight accumulation on different levels of AD values in a last frame image, such that the entire brightness of the image may not be influenced by local overbright or overdark targets. In the meantime, in combination of the column diagram statistics technology, the system and method may perform grayscale shift for bright or dark targets which are beyond a linear scope, so as to be compressed as falling within the linear scope, such that the details of the bright or dark targets may be maintained.

In order to realize the object, the present application provides a system for processing digital signals of an infrared image, which comprising a FPGA chip provided on the infrared camera, for processing digital signals of plural-frame infrared images captured by the infrared camera, wherein the FPGA chip comprises: an image process module, which is, in a frame's backward-stroke, to perform a differential weight accumulation process on an original column diagram data representing an original column diagram curve distribution of a current frame image, so as to filter overbright or overdark pixels, and output a grayscale value data of a last frame image after being processed by the image process module in the last frame's backward-stroke; and an image output module connected with the image process module, which is, in a frame's forward stroke, to receive the grayscale value data of the last frame image and perform a grayscale shift process in way of multi-meandering lines on the received grayscale value data, so as to perform different levels of brightness grayscale shift for the grayscale value data on the bright or dark side, and output the grayscale value data of the last frame image after being grayscale shifted in way of multi-meandering lines.

According to the embodiments of the present application, wherein, the differential weight accumulation process on the original column diagram data performed by the image process module comprises: finding out a minimum value in those biggest grayscale values whose pixel numbers occupy 2% of a sum of pixels as a maximum grayscale value of the sum of pixels, that is, when accumulating from the pixel point of the biggest grayscale value in the column diagram down to the extent that the accumulated pixel numbers occupy 2% of the sum of pixels, the grayscale value at this time will be the maximum grayscale value Xmax of the sum of pixels; finding out a maximum value in those least grayscale values whose pixel numbers occupy 2% of the sum of pixels as a minimum grayscale value of the sum of pixels, that is, when accumulating from the pixel point of the least grayscale value in the column diagram up to the extent that the accumulated pixel numbers occupy 2% of the sum of pixels, the grayscale value at this time will be the minimum grayscale value Xmin of the sum of pixels; and compressing all grayscale values of the pixels larger than Xmax to 255, and all grayscale values of the pixels less than Xmin to 0.

According to the embodiments of the present application, wherein in the frame's backward-stroke, the image process module performs a column diagram weighting process on the column diagram data after being differential weight accumulated by computing a weighting function y(X), so as to smooth a peak of the original column diagram off to obtain a more uniform target column diagram distribution curve, wherein computing the weighting function comprises: determining a highest point h(X0) of the peak of the function h(Xn) in an original column diagram distribution curve, namely, h(X0)=MAX[h(Xn)]; determining a bandwidth of the peak smooth process, which is the grayscale value Xbw1-Xbw2 when an amplitude of h(Xn) drops from the peak to $1/\sqrt{2}$ of the peak value; according to an expected smoothed effect, obtaining a function h(Xk) of the target column diagram distribution curve in the target column diagram, wherein h(Xk) in the bandwidth Xbw1-Xbw2 has a curve waveform similar to that of a function h(Xn) of the original column diagram distribution curve outside the bandwidth Xbw1-Xbw2, and the h(Xk) outside the bandwidth Xbw1-Xbw2 nearly equals to the function h(Xn) of the original column diagram distribution curve outside the bandwidth Xbw1-Xbw2; and the weighting function y(X), the function h(Xn) of the original column diagram distribution curve and the function h(Xk) of the target column diagram distribution curve have an expression as below: h(Xk)=h(Xn)*y(X), wherein, Xn represents a grayscale value of a pixel in the original image, h(Xn) is a number of the pixels having a corresponding grayscale value; Xk represents a grayscale value of a pixel in the target column diagram, h(Xk) is a number of the pixels having a corresponding grayscale value; X represents a definition domain of the weighting function y(X) corresponding to Xk, and y(X) represents a value domain of the weighting function.

According to the embodiments of the present application, wherein, the grayscale shift process in way of multi-meandering lines performed by the image output module comprises: dividing a grayscale space of the pixel grayscale values of the last frame image into several sections, wherein each section corresponds to one of slopes respectively representing different grayscale shift coefficients, each pixel's grayscale value in every section respectively multiplies the slope corresponding to the section so as to be used as the grayscale value of the pixel after being grayscale shifted in way of multi-meandering lines.

According to the embodiments of the present application, wherein the FPGA chip further comprises: a synchronize/control module for controlling the image process module and the image output module, so as to respectively perform the frame's backward-stroke and the frame's forward-stroke at different timings of the signals process sequences.

According to the embodiments of the present application, wherein, the FPGA chip further comprises: a two-port RAM connected with the image process module, for receiving digital signals coming from the plural-frame infrared images of the infrared camera, and counting number of pixels of every grayscale level in the current frame image.

According to the embodiments of the present application, wherein, in the frame's backward-stroke, the image process module, after having finished the above processes on the original column diagram data of the current frame image, performs a grayscale transformation process on the processed column diagram data to obtain a column diagram equalization.

According to the embodiments of the present application, wherein, in the frame's backward-stroke, the image process module, after having finished the grayscale transformation process, performs a mid-value filter process on the equalized column diagram data to filter a background noise brought by the equalization.

According to the embodiments of the present application, wherein, the image output module outputs the grayscale value data of the last frame image after being grayscale shifted in way of multi-meandering lines to a video decode module on the infrared camera to decode the video data, and the decoded video data are then transmitted to the image display module on the infrared camera to display.

In order to realize the object, the present application also provides a method for processing digital signals of infrared image, which comprising steps of: in a frame's backward-stroke, performing a differential weight accumulation process on an original column diagram data representing an original column diagram curve distribution of a current frame image, so as to filter overbright or overdark pixels, and outputting grayscale value data of a last frame image after being processed in last frame's backward-stroke; and in a frame's forward stroke, receiving the grayscale value data of the last frame image and performing a grayscale shift process in way of multi-meandering lines on the received grayscale value data, so as to perform different levels brightness grayscale shift for the grayscale value data on bright or dark side, and outputting the grayscale value data of the last frame image after being grayscale shifted in way of multi-meandering lines.

According to the embodiments of the present application, wherein the differential weight accumulation process on the original column diagram data comprises steps of: finding out a minimum value in those biggest grayscale values whose pixel numbers occupy 2% of a sum of pixels as a maximum grayscale value of the sum of pixels, that is, when accumulating from the pixel point of the biggest grayscale value in the column diagram down to the extent that the accumulated pixel numbers occupy 2% of the sum of pixels, the grayscale value at this time will be the maximum grayscale value Xmax of the sum of pixels; finding out a maximum value in those least grayscale values whose pixel numbers occupy 2% of the sum of pixels as a minimum grayscale value of the sum of pixels, that is, when accumulating from the pixel point of the least grayscale value in the column diagram up to the extent that the accumulated pixel numbers occupy 2% of the sum of pixels, the grayscale value at this time will be the minimum grayscale value Xmin of the sum of pixels; and compressing all grayscale values of the pixels larger than Xmax to 255, and all grayscale values of the pixels less than Xmin to 0.

According to the embodiments of the present application, wherein in the frame's backward-stroke, after having finished the differential weight accumulation process, performing a column diagram weighting process on the column diagram data after being differential weight accumulated by computing a weighting function y(X), so as to smooth a peak of the original column diagram off to obtain a more uniform target column diagram distribution curve, wherein computing the weighting function comprises steps of: determining a highest point h(X0) of the peak of the function h(Xn) in an original column diagram distribution curve, namely, h(X0) =MAX[h(Xn)]; determining a bandwidth of the peak smooth process, which is the grayscale value Xbw1-Xbw2 when an amplitude of h(Xn) drops from the peak to $1/\sqrt{2}$ of the peak value; according to an expected smoothed effect, obtaining a function h(Xk) of the target column diagram distribution curve in the target column diagram, wherein h(Xk) in the bandwidth Xbw1-Xbw2 has a curve waveform similar to that of a function h(Xn) of the original column diagram distribution curve outside the bandwidth Xbw1-Xbw2, and the h(Xk) outside the bandwidth Xbw1-Xbw2 nearly equals to the function h(Xn) of the original column diagram distribution curve outside the bandwidth Xbw1-Xbw2; and the weighting function y(X), the function h(Xn) of the original column diagram distribution curve and the function h(Xk) of the target column diagram distribution curve have an expression as below: h(Xk)=h(Xn)*y(X), wherein, Xn represents a grayscale value of a pixel in the original image, h(Xn) is a number of the pixels having a corresponding grayscale value; Xk represents a grayscale value of a pixel in the target column diagram, h(Xk)

is a number of the pixels having a corresponding grayscale value; X represents a definition domain of the weighting function y(X) corresponding to Xk, and y(X) represents a value domain of the weighting function.

According to the embodiments of the present application, wherein, the grayscale shift process in way of multi-meandering lines comprises: dividing a grayscale space of the pixel grayscale values of the last frame image into several sections, wherein each section corresponds to one of slopes respectively representing different grayscale shift coefficients, each pixel's grayscale value in every section respectively multiplies the slope corresponding to the section so as to be used as the grayscale value of the pixel after being grayscale shifted in way of multi-meandering lines.

According to the embodiments of the present application, wherein the frame's backward-stroke and the frame's forward-stroke are performed at different timings of the signals process sequences.

According to the embodiments of the present application, the method further comprises steps of: in the frame's backward-stroke, before performing the differential weight accumulation process, receiving digital signals coming from the plural-frame infrared images of the infrared camera, counting a number of pixels of every grayscale level in the current frame image, and obtaining an original column diagram distribution curve of the current frame image according to the counted values.

According to the embodiments of the present application, in the frame's backward-stroke, after having finished the above processes, performing a grayscale transformation process on the processed column diagram data to obtain an equalized column diagram.

According to the embodiments of the present application, wherein in the frame's backward-stroke, after having finished the grayscale transformation process on the weighted column diagram, performing a mid-value filter process on the equalized column diagram data to filter a background noise brought by the equalization.

According to the embodiments of the present application, the method also comprises steps of: performing a video data decode on the output grayscale value data of the last frame image after being grayscale shifted in way of multi-meandering lines to display.

While increasing the image contrast in the present application, the signal-to-noise ratio is effectively improved, such that the details of the target in image are much clearer, and the adaptability for different scenes is improved.

Specifically, the present application has advantage as below.

1. For an infrared image with lower contrast, the column diagram distribution thereof is concentrated, a grayscale level corresponding to a peak is usually the background of the image. Especially when a target is smaller in an area, that kind of distribution is more evident. A weighting process may smooth that peak off, and save space for a back-end column diagram equalization process.

2. A mid-value filter may effectively filter the background noise brought by the column diagram equalization.

3. The entire brightness of the image may be maintained at a proper and steady level, with better scene adaptability.

4. The grayscale values of overbright targets are shifted in way of multi-meandering lines, so as to avoid local saturation of the image.

Additional aspects and advantages will be apparent from the following detailed description of preferred embodiments, which proceeds with reference to the accompanying drawings.

BRIEF DESCRIPTION OF THE DRAWINGS

FIG. 5b illustrates an image obtained after performing conventional column diagram equalization for the original image in FIG. 5a.

FIG. 5c illustrates an image obtained after performing the method for processing digital signals of an infrared image process in the present application for the original image in FIG. 5a.

DETAILED DESCRIPTION OF PREFERRED EMBODIMENTS

The foregoing and other targets, aspects and advantages of the present application will become more apparent from the following detailed description of the embodiments in the present application taken in conjunction with the preferred embodiments and accompanying drawings. The embodiments here are only used to illustrate but not to limit the present application.

Using the accumulated average values of AD values of respective points in the last frame image as references of brightness shift for current frame image and performing the column diagram equalization are common means in image process. Especially the column diagram equalization, until now, is still one of the most common means of image enhancements. For visible light images, the equalization may have a rather evident effect. However, because of the special characteristic of the infrared image itself (whose background will occupy relatively large grayscale levels, while the target occupy smaller grayscale levels), an equalization with no preprocess will easily enlarge the background noise as well, or even have the background in the image to be stretched after equalization, and the target to be suppressed. A purpose of the present application is to perform a column diagram weighting process before equalization, so as to suppress the background noise, and to perform a mid-value filter to further improve the signal-to-noise ratio.

Figure 1:
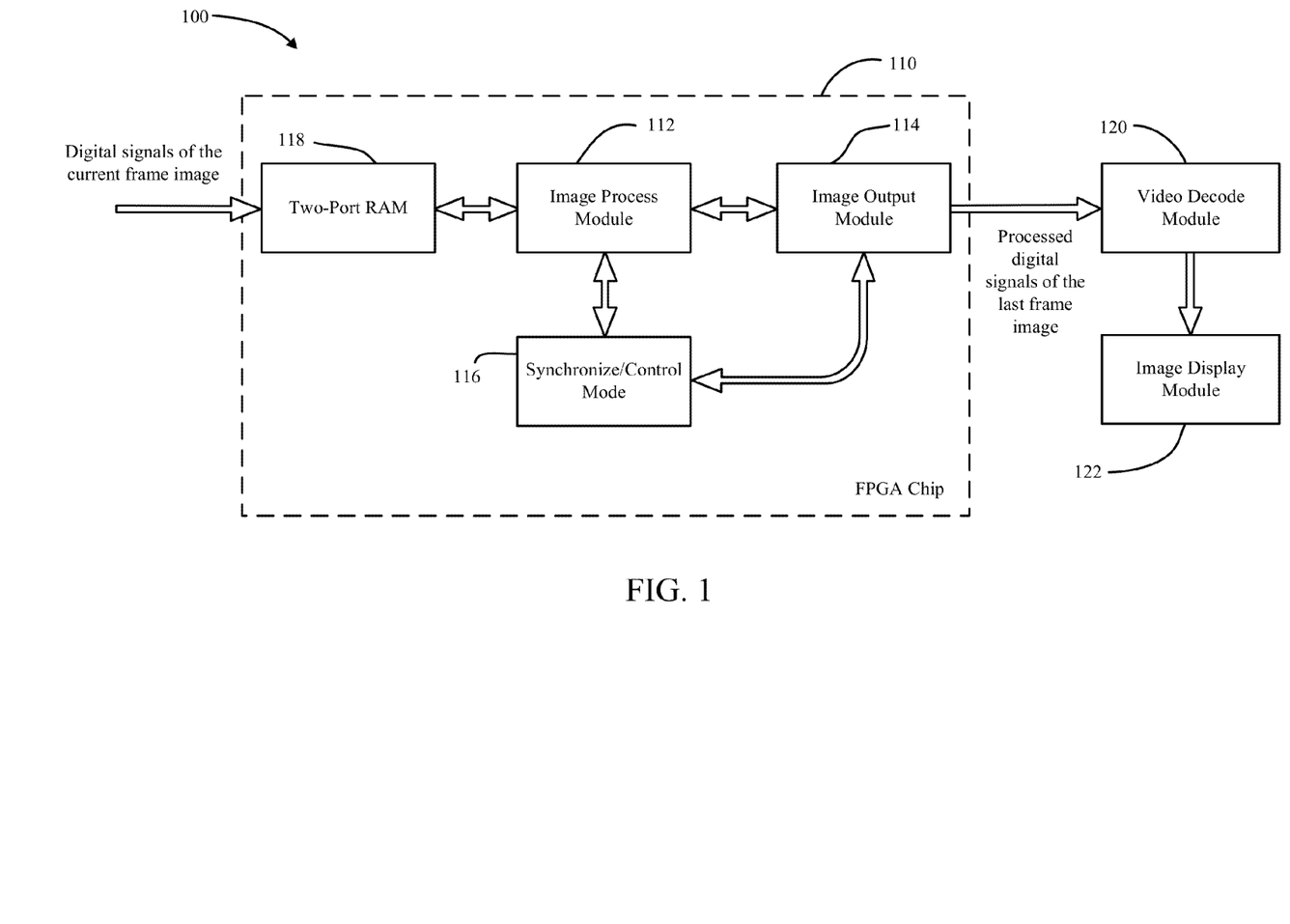
FIG. 1 is a block diagram showing the principles of the system for processing digital signals of infrared image according to an embodiment of the present application.

As shown in FIG. 1, according to one embodiment of the present application, the system 100 for processing digital signals of an infrared image of the present application may comprise a FPGA chip 110 provided on the infrared camera, for processing digital signals of plural-frame infrared images captured by the infrared camera, wherein the FPGA chip 110 comprises: an image process module 112, which is, in frame's backward-stroke, to perform a differential weight accumulation process on original column diagram data representing an original column diagram curve distribution of a current frame image, so as to filter overbright or overdark pixels, and transmit the grayscale value data of the last frame image after being processed by the image process module 112 in the last frame's backward-stroke to an image output module 114; and an image output module 114 connected with the image process module 112, which is, in the frame's forward stroke, to perform a grayscale shift process in way of multi-meandering lines on the received grayscale value data of the last frame image, so as to perform different levels of brightness grayscale shift for the grayscale value data on bright or dark side, and output the grayscale value data of the last frame image after being grayscale shifted in way of multi-meandering lines; a synchronize/control module 116 for controlling the image process module 112 and the image output module 114, so as to respectively perform the differential weight accumulation process and the grayscale shift process in way of multi-meandering lines at different timings of the signals process sequences; and a two-port RAM 118 connected with the image process module 112, for receiving digital signals coming from the plural-frame infrared images of the infrared camera, and counting the number of pixels of every grayscale level in the current frame image.

The image output module 114 outputs the grayscale value data of the last frame image after being grayscale shifted in way of multi-meandering lines to the video decode module 120 on the infrared camera to decode the video data, and the video data after being decoded are then transmitted to the image display module 122 on the infrared camera to display.

Figure 2:
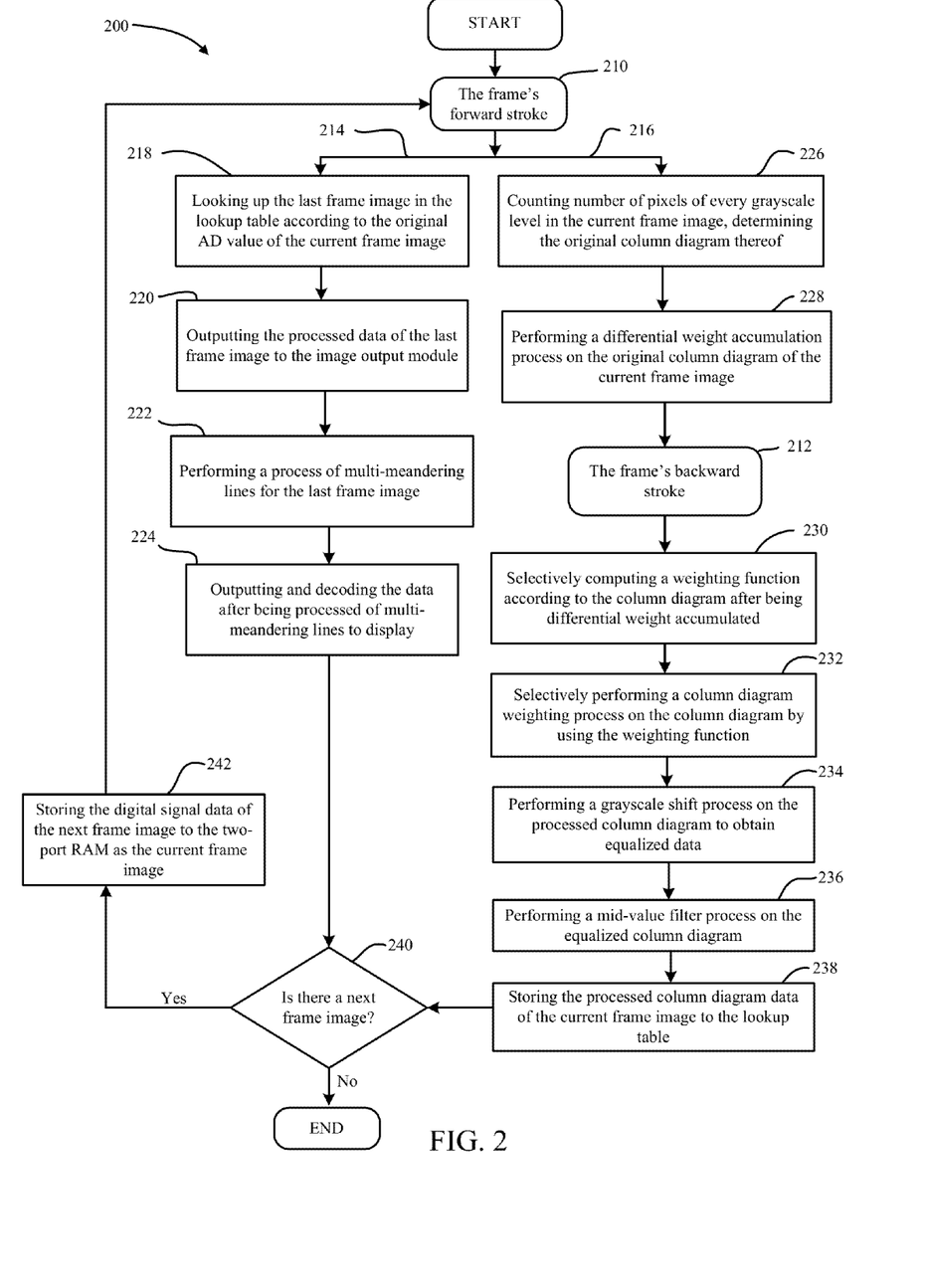
FIG. 2 is a flow chart showing the operation of the method for processing digital signals of infrared image according to an embodiment of the present application.

FIG. 2 is a flow chart showing the operation of the method 200 for processing digital signals of infrared image according to an embodiment of the present application.

As shown in FIG. 2, according to one embodiment of the present application, the method 200 for processing digital signals of an infrared image of the present application mainly comprises two process procedures, which are a frame's forward-stroke (at step 210) and a frame's backward-stroke (at step 212).

In the frame's backward-stroke, it is to perform a differential weight accumulation process on the original column diagram data representing the original column diagram curve distribution of the current frame image, so as to filter overbright or overdark pixels, and to transmit the grayscale value data of the last frame image after being processed in the last frame's backward-stroke to the image output module.

In the frame's forward stroke, it is to perform a grayscale shift process in way of multi-meandering lines on the received grayscale value data of the last frame image, so as to perform different levels grayscale shift on the grayscale value data with brightness on bright or dark side, and to output the grayscale value data of the last frame image after being grayscale shifted in way of multi-meandering lines.

Specifically, the frame's forward-stroke process and the frame's backward-stroke process usually comprise the content as below.

1. During the frame's forward-stroke process, the system performs two processes at the same time: outputting and displaying (shown in branch 214) the grayscale value data of the last frame image, and counting (shown in branch 216) the grayscale value data of the current frame image.

Wherein the frame's forward-stroke process comprises: 1) outputting data of the last frame image: using the original AD value (at step 218) of the current frame image as a base address, finding data of the last frame image after being counted and processed (which are grayscale mapping values, i.e., the column diagram data after being mid-value filtered and finally stored in the lookup table, after the last frame image is processed in the frame's forward-stroke and the frame's backward-stroke) in a lookup table so as to be transmitted (at step 220) to the image output module in FPGA, wherein the module performs (at step 222) the grayscale shift in way of multi-meandering lines, to prevent the image from overdark or overbright.

The grayscale shift process in way of multi-meandering lines comprises: dividing the grayscale space of the pixel grayscale values of the last frame image into several sections, each section corresponds to one of slopes respectively representing different grayscale shift coefficients, each pixel's grayscale value in every section respectively multiplies the slope corresponding to the section so as to be used as the grayscale value of the pixel after being grayscale shifted in way of multi-meandering lines.

Figure 3:
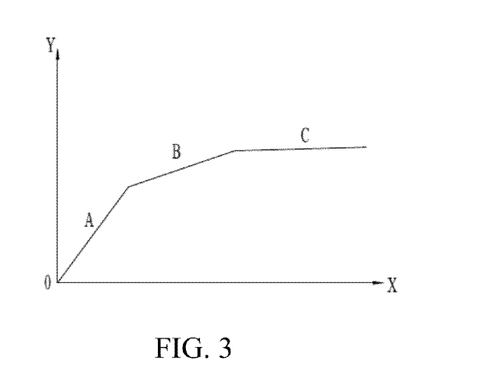
FIG. 3 is a diagram showing the image output module performing grayscale shift in way of three meandering lines for the last frame image.

For example, as one embodiment of the present application, FIG. 3 shows the image output module performing the grayscale shift in way of three meandering lines for the last frame image, wherein an x axis represents the grayscale space of all pixels' grayscale value of the last frame image, a y axis represents the grayscale value after being grayscale shifted. When performing grayscale shift, the grayscale space of the last frame image may be divided into three sections, each section respectively multiplies the corresponding slope (the slope represents the grayscale shift coefficients, wherein a low grayscale level section corresponds to a grayscale shift coefficient usually larger than 1, a middle section usually is not shifted, namely, its corresponding grayscale shift coefficient is 1, and a high grayscale section corresponds to a grayscale shift coefficient usually less than 1), and finally the grayscale value data after being shifted are transmitted to a video decode module at exterior of the FPGA chip to output and display (at step 224).

The grayscale shift process in way of multi-meandering lines of the present application is not to be limited to the above embodiment. The divided section number of the grayscale space for the last frame image and the amount of the meandering lines' slope corresponding to each section may be adjusted properly according to the display qualities of the original image and the target image (i.e., an image after being processed).

Wherein the frame's forward-stroke process comprises: 2) counting data of the current frame image: the FPGA receiving digital signals of the plural-frame infrared images coming from the infrared camera through a self-contained two-port RAM, counting (at step 226) the number of pixels of every grayscale level in the current frame image, obtaining the column diagram distribution of the original image (hereafter referred as an original column diagram) of the current frame image according to the counted number, and then performing (at step 228) the differential weight accumulation process on the AD value of the different levels in the original image column diagram, wherein the differential weight accumulation process is accomplished in three steps of:

(1) finding out a minimum value in, for example, 2% (the percentage may be adaptively adjusted according to the displayed image quality) of those biggest grayscale values as a maximum grayscale value of a sum of pixels, that is, when accumulating from the pixel point of the biggest grayscale value in the column diagram down to the extent that the accumulated pixel numbers occupy 2% of the sum of pixels, the grayscale value at this time will be the maximum grayscale value Xmax to be looked up;

(2) finding out a maximum value in, for example, 2% (the percentage may be adaptively adjusted according to the displayed image quality) of those least grayscale values as a minimum grayscale value of the sum of pixels, that is, when accumulating from the pixel points of the least grayscale value in the column diagram up to the extent that the accumulated pixel numbers occupy 2% of the sum of pixels, the grayscale value at this time will be the minimum grayscale value Xmin to be looked up; and (3) compressing all grayscale values of the pixels larger than Xmax to 255, and all grayscale values of the pixels less than Xmin to 0 (assuming the image grayscale is quantized in a level of 8 bits).

2. During the frame's backward-stroke process, the system may perform the processes as below.

Wherein the frame's backward-stroke process may comprise: 1) In a first stage of the frame's backward-stroke, according to the column diagram distribution curve after being differential weight accumulated, computing (at step 230) a weighting function.

Figure 4A:
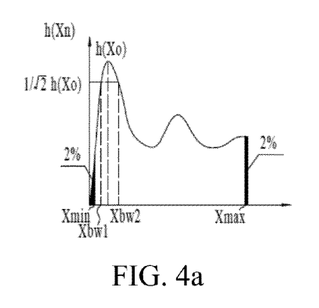
FIG. 4a is a diagram showing an original column diagram of the current frame image.
Figure 4B:
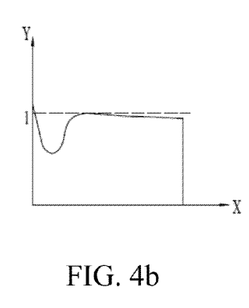
FIG. 4b is a diagram showing a weighting function computed by the method for processing digital signals of infrared image according to the present application.
Figure 4C:
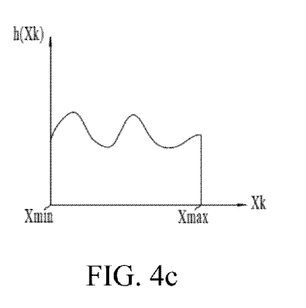
FIG. 4c is a diagram showing a column diagram obtained after performing a column diagram weighting process on the original column diagram in FIG. 4a by using the weighting function shown in FIG. 5b.

After finished the differential weight accumulation process, the column diagram weighting process is performed (at step 232) on the column diagram data after being differential weight accumulated by computing the weighting function $y(X)$, so as to smooth off the peak of the original column diagram to obtain a more uniform target column diagram distribution curve. Please refer to FIGS. 4a-4c, wherein, FIG. 4a is a diagram showing the original column diagram of the current frame image; FIG. 4b is a diagram showing a weighting function computed by the method for processing digital signals of infrared image according to the present application; FIG. 4c is a diagram showing a column diagram obtained after performing the column diagram weighting process on the original column diagram in FIG. 4a by using the weighting function shown in FIG. 4b.

Wherein computing the weighting function may comprise steps of:

determining a highest point $h(X0)$ of the peak of the function $h(Xn)$ in an original column diagram distribution curve, namely, $h(X0)=MAX[h(Xn)]$;

determining a bandwidth of the peak smooth process, which is the grayscale value Xbw1-Xbw2 when the amplitude of $h(Xn)$ drops from the peak to $1/\sqrt{2}$ of the peak value;

according to the expected smoothed effect, obtaining a function $h(Xk)$ of the target column diagram distribution curve in the target column diagram, wherein $h(Xk)$ in the bandwidth Xbw1-Xbw2 has a curve waveform similar to that of the function $h(Xn)$ of the original column diagram distribution curve outside the bandwidth Xbw1-Xbw2, and the $h(Xk)$ outside the bandwidth Xbw1-Xbw2 nearly equals to the function $h(Xn)$ of the original column diagram distribution curve outside the bandwidth Xbw1-Xbw2; and the weighting function $y(X)$, the function $h(Xn)$ of the original column diagram distribution curve and the function $h(Xk)$ of the target column diagram distribution curve have an expression as below:

$$h(Xk)=h(Xn)*y(X),$$

wherein, as shown in FIG. 4a, Xn is a grayscale value contained in the original image, $h(Xn)$ is a number of the pixel points having the same grayscale value; as shown in FIG. 4b, wherein X is a grayscale value corresponding to the grayscale value in the original image, y is a weighting function value of the pixel points having the same grayscale value, in another word, X represents a definition domain of the weighting function corresponding to Xk and Xn, and $y(X)$ represents a value domain of the weighting function; as shown in FIG. 4c, Xk is a grayscale value contained in the image after being weighted, and it can be seen from FIGS. 4a, 4b, and 4c that, Xk and Xn basically correspond to each other, y is a number of the pixels having the same grayscale value.

It is indicated from experiments that, in the bandwidth Xbw1-Xbw2, the peak of the original column diagram of the infrared image usually distributes in way of exponential, thus the weighting function $y(X)$ in this bandwidth is also necessarily in way of exponential, and since $h(Xk)$ out of the bandwidth Xbw1-Xbw2 approximately equals to $h(Xn)$, $y(X)$ approximately equal to 1, as shown in FIG. 4b.

Wherein the frame's backward-stroke process may comprise: 2) in a second stage of the frame's backward-stroke, using the weighting function to perform the column diagram weighting process (please note that the column diagram weighting process here is different from the differential weight accumulation process described as above) on the original column diagram data. For a certain frame image, according to the specific scene target and the good or bad quality of its output image, a user determines whether a single differential weight accumulation process needs to be performed or a column diagram weighting process also needs to be further performed, and a control command is sent from a terminal to selectively perform the column diagram weighting process.

As shown in FIG. 4c, the column diagram after being weighted turns to be more smoothed and uniform.

Therefore, the main purpose of the column diagram weighting process is to smooth the peak of the original column diagram off, such that the weighted column diagram distribution turns to be more uniform.

Wherein the frame's backward-stroke process may comprise: 3) in a third stage of the frame's backward-stroke, performing (at step 234) a grayscale transformation process on the column diagram data after being column diagram weighted to accomplish the column diagram equalization. It should be understood that, performing the column diagram equalization after the column diagram weighting process of the present application described as above will alleviate the level of the background noise as compared to that caused by the conventional process that performs the column diagram equalization directly without a weighting process.

Wherein the frame's backward-stroke process may also comprise: 4) in a last stage of the frame's backward-stroke, performing (at step 236) a mid-value filter process on the column diagram after equalization. Although the column diagram weighting can better smooth the peak of the original column diagram off, performing an equalization again may possibly enlarge the background noise again, since one of the bad effects of the column diagram equalization is to enlarge the background noise, which is usually unavoidable, only can be reduced to a possible extent, and performing the weighting process before equalization is to alleviate the background noise to a possible extent, but the background noise is still inevitably enlarged, thus a mid-value filter process is needed. The mid-value filter is to filter the background noise which is possibly caused by the equalization.

According to practical effects, the mid-value filter for example may select four points or nine points to perform the mid-value process, which may not only perform better filter on the noise, but also make the output layout more uniform, and make the scene adaptability better.

The column diagram data after being mid-value filtered are stored (at step 238) into the lookup table, while the two-port RAM is cleared.

Hereafter, inquiring (at step 240) if there is a next frame image, and if there is any, the current frame image after the above processes is used as the last frame image, and the next frame image is used (at step 242) as the current frame image, the related data are performed repeatedly with the above processes from the frame's forward-stroke to the frame's backward-stroke.

Wherein, under the control of the synchronize/control module on the FPGA chip, the frame's forward-stroke process and the frame's backward-stroke process are performed respectively by the image output module and the image process module on the FPGA chip at different timings of the signal process sequences. Further, the present application actually uses some gaps in the original signals process sequences to respectively perform the data counting, computing and transforming processes in the frame's forward-stroke and the frame's backward-stroke process, therefore no more sequence resources and the inner RAM resources of the FPGA chip need to be consumed.

In each frame image, after finishing the above frame's forward-stroke process and the frame's backward-stroke process, the video decode module provided on the infrared camera performs a video data decode on the grayscale value data of the frame of image (here it's the last frame with respect to the current frame) output from the image output module and after being grayscale shifted in way of multi-meandering lines, so as to be displayed by the image display module on the infrared camera.

Figure 5A:
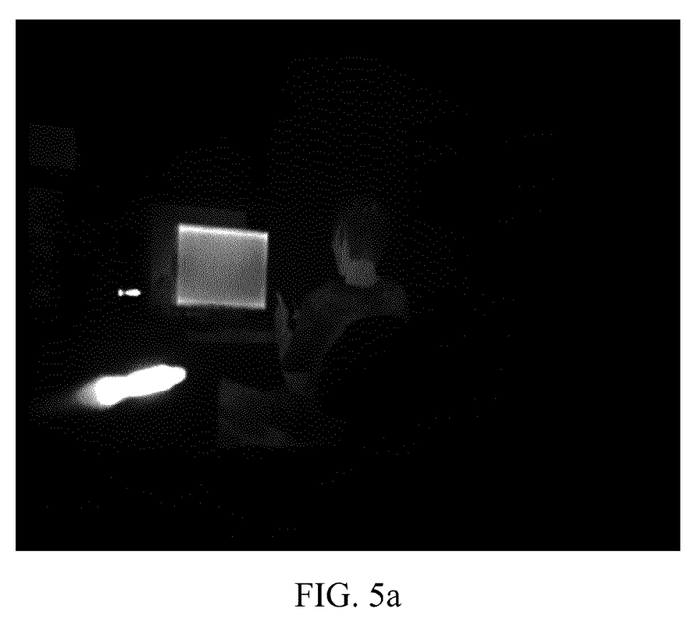
FIG. 5a illustrates an original image of the displayed current frame infrared image.
Figure 5B:
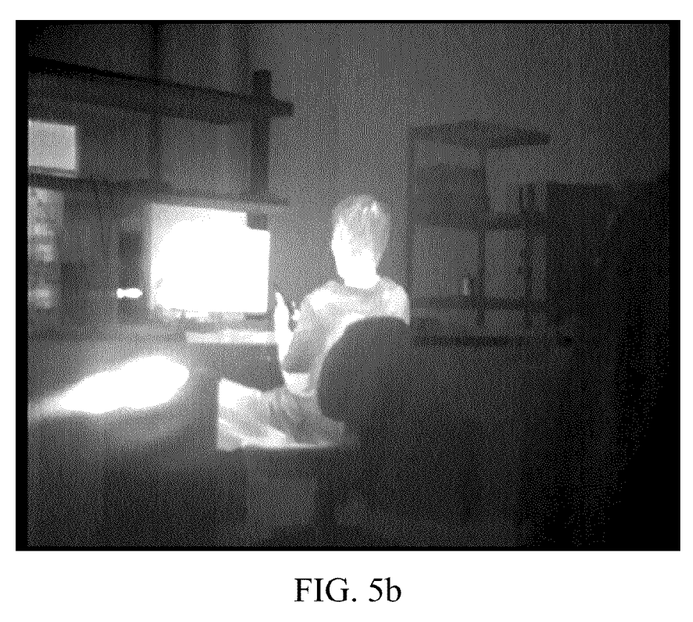
Figure 5C:
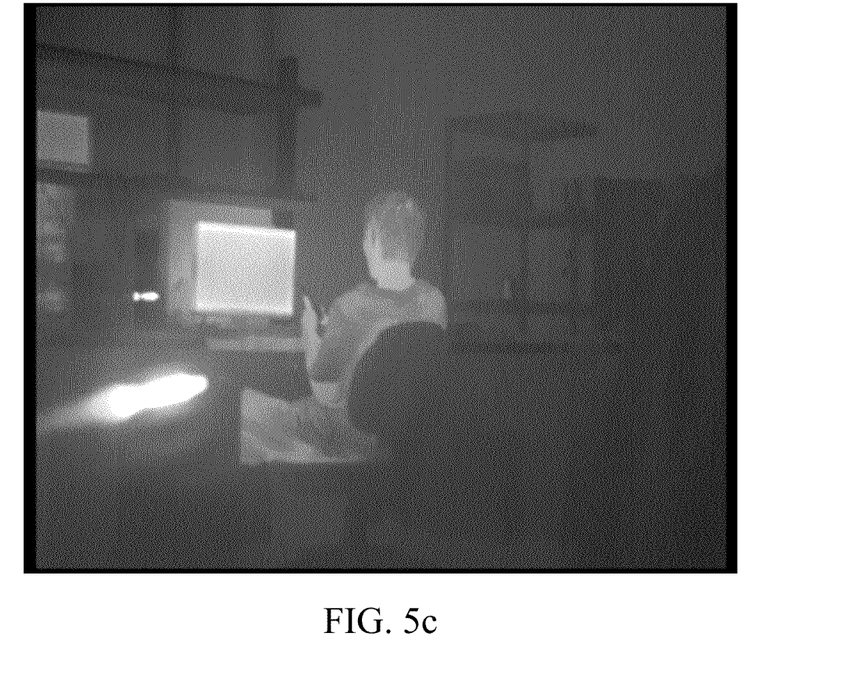

FIGS. 5a-5c respectively illustrate the display effects of an original image of the current frame infrared image, an image obtained after performing conventional column diagram equalization for the original image, and an image obtained after performing the method for processing digital signals of an infrared image process in the present application for original image.

As shown in FIG. 5a, the original image without any process shows a situation that when a high bright target displayed in a scene, the background is pushed blank.

As shown in FIG. 5b, the original image, after a conventional column diagram equalization is performed thereon, shows deficiencies that the displayed image has bigger noise, and the high bright target is easy to be saturated.

As shown in FIG. 5c, the original image, after performed with the method for processing digital signals of infrared image according to the present application, shows that the contrast of the displayed image is enhanced while the noise is suppressed, therefore the scene adaptability is improved, and the image definition is evidently improved.

The present application has effects and advantages for the whole flow over the prior art as below.

The present application is similar in the whole flow of signal processing to that of the prior art. However, when in processing, the present application has advantages combined with the two old ones. Because the counting, computing and transforming processes are added in gaps in the original signals process sequences, no more sequence resources and the inner RAM resources of the FPGA chip need to be consumed, therefore the hardware system need not to be upgraded, and the scene adaptability of the infrared image may be greatly improved. With the image enhancement of the column diagram weighting process, the background of the image is better suppressed, and the targets are distinct.

Technical points of the present application include:

a. differential weight accumulations are performed on different levels of AD values, so as to filter overbright or overdark pixels, maintain the image's entire brightness to be stable, and improve the scene adaptability;

b. the grayscale shift in way of multi-meandering lines applies different levels of grayscale shift on grayscale value data with brightness on bright or dark side, so as to obtain more uniform of image's entire brightness, and better scene adaptability; and c. with the column diagram enhancements of column diagram weighting process and the mid-value filter and the like, an image enhancement is achieved effectively, the background and noise are suppressed, and the targets are distinct.

The present algorithm overcomes the disadvantages of the ordinary column diagram equalization algorithm, while the different scenes may be self-adaptively enhanced for the original image, the image's background is better suppressed, and the targets are distinct.

Although embodiments have been described with reference to a number of illustrative embodiments thereof, it should be understood that numerous other modifications and embodiments can be devised by those skilled in the art that will fall within the spirit and scope of the principles of embodiments. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A system for processing digital signals of an infrared image, comprising a field-programmable gate array (FPGA) chip provided on an infrared camera, for processing digital signals of plural-frame infrared images captured by the infrared camera, wherein the FPGA chip comprises:

an image process module to, in a frame's backward-stroke, perform a differential weight accumulation process on an original column diagram data representing an original column diagram curve distribution of a current frame image, so as to filter overbright or overdark pixels, and output grayscale value data of a last frame image after being processed by the image process module in a last frame's backward-stroke, wherein the differential weight accumulation process on the original column diagram data performed by the image process module comprises:

finding out a minimum value in those biggest grayscale values whose pixel numbers occupy 2% of a sum of pixels as a maximum grayscale value of the sum of pixels, that is, when accumulating from a pixel point of a biggest grayscale value in the column diagram down to an extent that accumulated pixel numbers occupy 2% of the sum of pixels, the grayscale value at this time is the maximum grayscale value Xmax of the sum of pixels;

finding out a maximum value in those least grayscale values whose pixel numbers occupy 2% of the sum of pixels as a minimum grayscale value of the sum of pixels, that is, when accumulating from a pixel point of a least grayscale value in the column diagram up to an extent that accumulated pixel numbers occupy 2% of the sum of pixels, the grayscale value at this time is the minimum grayscale value Xmin of the sum of pixels; and compressing all grayscale values of the pixels larger than Xmax to 255, and all grayscale values of the pixels less than Xmin to 0; and an image output module connected with the image process module to, in a frame's forward stroke, receive the grayscale value data of the last frame image and perform a grayscale shift process in way of multi-meandering lines on the received grayscale value data, so as to perform different levels of brightness grayscale shift for the grayscale value data on bright or dark side, and output the grayscale value data of the last frame image after being grayscale shifted in way of multi-meandering lines.

2. The system for processing digital signals of an infrared image according to claim 1, wherein in the frame's backward-stroke, the image process module performs a column diagram weighting process on the column diagram data after being differential weight accumulated by computing a weighting function y(X), so as to smooth a peak of the original column diagram off to obtain a more uniform target column diagram distribution curve, wherein computing the weighting function comprises:
  determining a highest point h(X0) of the peak of the function h(Xn) in an original column diagram distribution curve, namely, h(X0) =MAX[h(Xn)];
  determining a bandwidth of the peak smooth process, which is a grayscale value Xbw1-Xbw2 when an amplitude of h(Xn) drops from the peak to $1/\sqrt{2}$ of the peak value;
  according to an expected smoothed effect, obtaining a function h(Xk) of the target column diagram distribution curve in the target column diagram, wherein h(Xk) in the bandwidth Xbw1-Xbw2 has a curve waveform similar to that of a function h(Xn) of the original column diagram distribution curve outside the bandwidth Xbw1-Xbw2, and the h(Xk) outside the bandwidth Xbw1-Xbw2 nearly equals to the function h(Xn) of the original column diagram distribution curve outside the bandwidth Xbw1-Xbw2; and
  the weighting function y(X), the function h(Xn) of the original column diagram distribution curve and the function h(Xk) of the target column diagram distribution curve have an expression as below:

$$h(Xk)=h(Xn)*y(X)$$

wherein, Xn represents a grayscale value of a pixel in the original image, h(Xn) is a number of the pixels having a corresponding grayscale value, Xk represents a grayscale value of a pixel in the target column diagram, h(Xk) is a number of the pixels having a corresponding grayscale value, X represents a definition domain of the weighting function y(X) corresponding to Xk, and y(X) represents a value domain of the weighting function.

3. The system for processing digital signals of an infrared image according to claim 1, wherein the grayscale shift process in way of multi-meandering lines performed by the image output module comprises:
  dividing a grayscale space of the pixel grayscale values of the last frame image into several sections, wherein each section corresponds to one of slopes respectively representing different grayscale shift coefficients, each pixel's grayscale value in every section respectively multiplies the slope corresponding to the section so as to be used as the grayscale value of the pixel after being grayscale shifted in way of multi-meandering lines.

4. The system for processing digital signals of an infrared image according to any one of claims 1, 2 or 3, wherein the FPGA chip further comprises:
  a synchronize/control module for controlling the image process module and the image output module, so as to respectively perform the frame's backward-stroke and the frame's forward-stroke at different timings of the signals process sequences.

5. The system for processing digital signals of an infrared image according to claim 4, wherein the FPGA chip further comprises:
  a two-port random access memory (RAM) connected with the image process module, for receiving digital signals coming from the plural-frame infrared images of the infrared camera, and counting pixel numbers of every grayscale level in the current frame image.

6. The system for processing digital signals of an infrared image according to any one of claims 1, 2 or 3, wherein in the frame's backward-stroke, the image process module, after having finished the above processes on the original column diagram data of the current frame image, performs a grayscale transformation process on the processed column diagram data to obtain a column diagram equalization.

7. The system for processing digital signals of an infrared image according to claim 6, wherein in the frame's backward-stroke, the image process module, after having finished the grayscale transformation process, performs a mid-value filter process on the equalized column diagram data to filter a background noise brought by the equalization.

8. The system for processing digital signals of an infrared image according to any one of claims 1, 2 or 3, wherein the image output module outputs the grayscale value data of the last frame image after being grayscale shifted in way of multi-meandering lines to a video decode module on the infrared camera to decode the video data, and the decoded video data are then transmitted to the image display module on the infrared camera to display.

9. A method for processing digital signals of an infrared image, comprising steps of:
  in a frame's backward-stroke, performing a differential weight accumulation process on an original column diagram data representing an original column diagram curve distribution of a current frame image, so as to filter overbright or overdark pixels, and outputting grayscale value data of a last frame image after being processed in a last frame's backward-stroke, wherein the differential weight accumulation process on the original column diagram data comprises steps of:
    finding out a minimum value in those biggest grayscale values whose pixel numbers occupy 2% of a sum of pixels as a maximum qrayscale value of the sum of pixels, that is, when accumulating from a pixel point of a biggest grayscale value in the column diagram down to an extent that accumulated pixel numbers occupy 2% of the sum of pixels, the grayscale value at this time is the maximum qrayscale value Xmax of the sum of pixels;
    finding out a maximum value in those least grayscale values whose pixel numbers occupy 2% of the sum of pixels as a minimum grayscale value of the sum of pixels, that is, when accumulating from a pixel point of the least grayscale value in the column diagram up to an extent that accumulated pixel numbers occupy 2% of the sum of pixels, the grayscale value at this time is the minimum grayscale value Xmin of the sum of pixels; and
    compressing all grayscale values of the pixels larger than Xmax to 255, and all grayscale values of the pixels less than Xmin to 0; and
  in a frame's forward stroke, receiving the grayscale value data of the last frame image and performing a grayscale shift process in way of multi-meandering lines on the received grayscale value data, so as to perform different levels of brightness grayscale shift for the grayscale value data on bright or dark side, and outputting the grayscale value data of the last frame image after being grayscale shifted in way of multi-meandering lines.

10. The method for processing digital signals of an infrared image according to claim 9, wherein in the frame's backward-stroke, after having finished the differential weight accumulation process, performing a column diagram weighting process on the column diagram data after being differential weight accumulated by computing a weighting function y(X), so as to smooth a peak of the original column diagram off to obtain a more uniform target column diagram distribution curve, wherein computing the weighting function comprises steps of:
- determining a highest point h(X0) of the peak of the function h(Xn) in an original column diagram distribution curve, namely, h(X0)=MAX[h(Xn)];
- determining a bandwidth of the peak smooth process, which is a grayscale value Xbw1-Xbw2 when an amplitude of h(Xn) drops from the peak to $1/\sqrt{2}$ of the peak value;
- according to an expected smoothed effect, obtaining a function h(Xk) of the target column diagram distribution curve in the target column diagram, wherein h(Xk) in the bandwidth Xbw1-Xbw2 has a curve waveform similar to that of a function h(Xn) of the original column diagram distribution curve outside the bandwidth Xbw1-Xbw2, and the h(Xk) outside the bandwidth Xbw1-Xbw2 nearly equals to the function h(Xn) of the original column diagram distribution curve outside the bandwidth Xbw1-Xbw2; and
- the weighting function y(X), the function h(Xn) of the original column diagram distribution curve and the function h(Xk) of the target column diagram distribution curve have an expression as below:

$$h(Xk)=h(Xn)*y(X)$$

wherein, Xn represents a grayscale value of a pixel in the original image, h(Xn) is a number of the pixels having a corresponding grayscale value, Xk represents a grayscale value of a pixel in the target column diagram, h(Xk) is a number of the pixels having a corresponding grayscale value, X represents a definition domain of the weighting function y(X) corresponding to Xk, and y(X) represents a value domain of the weighting function.

11. The method for processing digital signals of an infrared image according to claim 9, wherein the grayscale shift process in way of multi-meandering lines comprises:
dividing a grayscale space of the pixel grayscale values of the last frame image into several sections, wherein each section corresponds to one of slopes respectively representing different grayscale shift coefficients, each pixel's grayscale value in every section respectively multiplies the slope corresponding to the section so as to be used as the grayscale value of the pixel after being grayscale shifted in way of multi-meandering lines.

12. The method for processing digital signals of an infrared image according to any one of claims 9, 10 or 11, wherein the frame's backward-stroke and the frame's forward-stroke are performed at different timings of the signals process sequences.

13. The method for processing digital signals of an infrared image according to claim 12, wherein the method further comprises steps of:
in the frame's backward-stroke, before performing the differential weight accumulation process, receiving digital signals coming from the plural-frame infrared images of the infrared camera, counting number of pixels of every grayscale level in the current frame image, and obtaining an original column diagram distribution curve of the current frame image according to the counted values.

14. The method for processing digital signals of an infrared image according to any one of claims 9, 10 or 11, wherein in the frame's backward-stroke, after having finished the above processes, performing a grayscale transformation process on the processed column diagram data to obtain an equalized column diagram.

15. The method for processing digital signals of an infrared image according to claim 14, wherein in the frame's backward-stroke, after having finished the grayscale transformation process on the weighted column diagram, performing a mid-value filter process on the equalized column diagram data to filter a background noise brought by the equalization.

16. The method for processing digital signals of an infrared image according to any one of claims 9, 10 or 11, the method also comprises steps of:
performing a video data decode on the output grayscale value data of the last frame image after being grayscale shifted in way of multi-meandering lines to display.

* * * * *